United States Patent
Khambam et al.

(10) Patent No.: US 11,016,896 B2
(45) Date of Patent: *May 25, 2021

(54) REDUCING OVERHEAD OF MANAGING CACHE AREAS

(71) Applicant: EMC IP Holding Company LLC, Hopkinton, MA (US)

(72) Inventors: Venkata Khambam, Cork (IE); Jeffrey R. Nelson, Dunstable, MA (US); Brian Asselin, Upton, MA (US); Rong Yu, West Roxbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,067

(22) Filed: Jan. 23, 2020

(65) Prior Publication Data

US 2020/0159660 A1 May 21, 2020

Related U.S. Application Data

(63) Continuation of application No. 15/964,315, filed on Apr. 27, 2018, now Pat. No. 10,579,529.

(51) Int. Cl.
*G06F 12/00* (2006.01)
*G06F 12/084* (2016.01)
*G06F 12/0842* (2016.01)
*G06F 12/0815* (2016.01)

(52) U.S. Cl.
CPC ........ *G06F 12/084* (2013.01); *G06F 12/0815* (2013.01); *G06F 12/0842* (2013.01); *G06F 2212/621* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,136,969 B1 * | 11/2006 | Niver | ................. | G06F 12/0808 711/141 |
| 8,700,727 B1 * | 4/2014 | Gole | ..................... | H04L 67/104 709/213 |
| 9,274,960 B2 * | 3/2016 | Kaxiras | ................. | G06F 9/3004 |
| 9,514,050 B1 * | 12/2016 | Agarwal | ............ | G06F 12/0815 |
| 9,703,706 B2 * | 7/2017 | Bagal | ................. | G06F 12/0811 |
| 9,852,073 B2 * | 12/2017 | Peterson | ............... | G06F 12/084 |

(Continued)

*Primary Examiner* — John A Lane
(74) *Attorney, Agent, or Firm* — Muirhead and Saturnelli, LLC

(57) ABSTRACT

Maintaining multiple cache areas in a storage device having multiple processors includes loading data from a specific portion of non-volatile storage into a local cache slot in response to a specific processor of a first subset of the processors performing a read operation to the specific portion of non-volatile storage, where the local cache slot is accessible to the first subset of the processors and is inaccessible to a second subset of the processors that is different than the first subset of the processors and includes converting the local cache slot into a global cache slot in response to one of the processors performing a write operation to the specific portion of non-volatile storage, wherein the global cache area is accessible to the first subset of the processors and to the second subset of the processors. Different ones of the processors may be placed on different directors.

20 Claims, 8 Drawing Sheets

(56) References Cited

U.S. PATENT DOCUMENTS

| | | | | |
|---|---|---|---|---|
| 9,880,933 | B1* | 1/2018 | Gupta | G06F 12/0815 |
| 2008/0250213 | A1* | 10/2008 | Holt | G06F 11/1658 |
| | | | | 711/159 |
| 2011/0145530 | A1* | 6/2011 | Taillefer | G06F 11/3648 |
| | | | | 711/163 |
| 2016/0147471 | A1* | 5/2016 | O'Hare | G06F 3/067 |
| | | | | 713/171 |
| 2016/0350352 | A1* | 12/2016 | Hase | G06F 12/084 |
| 2017/0308470 | A1* | 10/2017 | Bagal | G06F 12/084 |
| 2017/0351613 | A1* | 12/2017 | Anderson | G06F 12/0868 |
| 2018/0113806 | A1* | 4/2018 | Mola | G06F 12/084 |
| 2018/0341428 | A1* | 11/2018 | Guo | G06F 12/0815 |
| 2019/0004958 | A1* | 1/2019 | Vasudevan | G06F 12/0815 |

* cited by examiner

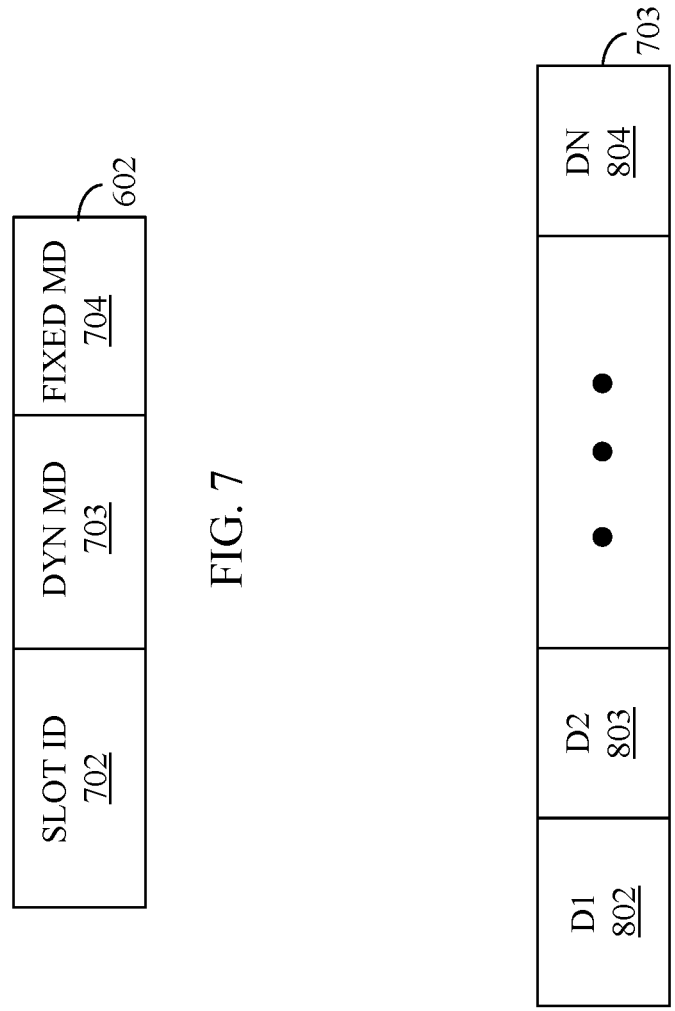

REDUCING OVERHEAD OF MANAGING CACHE AREAS

TECHNICAL FIELD

This application relates to the field of computer systems and storage devices therefor and, more particularly, to using cache memory in storage devices.

BACKGROUND OF THE INVENTION

Host processor systems may store and retrieve data using a storage device containing a plurality of host interface units (I/O modules), disk drives, and disk interface units (disk adapters). The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to any one of the actual disk drives. Allowing multiple host systems to access the single storage device unit allows the host systems to share data stored therein.

In some cases, global volatile memory may be used as global cache to temporarily store data that has been accessed. The global volatile memory is usually faster than the corresponding non-volatile memory, such as disk drives. When a host system reads data that is stored on a disk drive, the data is initially fetched from the disk drive and loaded into the global cache. Subsequent accesses are performed by reading the global cache without needing to access the disk drive. Eventually, when the data is no longer accessed, it may be removed from the global cache to make room for more active data. If the data is modified (written) while in the global cache, then the cache version of the data is written back to the disk drive.

A drawback to global cache is that, since it is being accessed by multiple processors (interface units) at the same time, it is necessary to provide additional mechanisms to prevent more than one processor from writing to the same data at the same time and to alert processors whenever data changes to prevent using data that is not current. In addition to the overhead associated with the additional mechanisms, there could also be delays when, for example, a first processor waits for a second processor to relinquish a lock on specific data. Data lockouts may occur even in situations where different processors are accessing unrelated data.

Accordingly, it is desirable to provide a system that addresses drawbacks associated with global cache.

SUMMARY OF THE INVENTION

According to the system described herein, maintaining multiple cache areas in a storage device having multiple processors includes loading data from a specific portion of non-volatile storage into a local cache area in response to a specific processor of a first subset of the processors performing a read operation to the specific portion of non-volatile storage, where the local cache area is accessible to the first subset of the processors and is inaccessible to a second subset of the processors that is different than the first subset of the processors and includes loading data from the specific portion of non-volatile storage into a global cache area in response to one of the processors performing a write operation to the specific portion of non-volatile storage, where the global cache area is accessible to the first subset of the processors and to the second subset of the processors. The data may be removed from the local cache area in response to one of the first subset of the processors performing a write operation thereto. Following removal from the local cache area, the data may be loaded into the global cache area. Different ones of the processors may be placed on different directors. The global cache area and the local cache area may be provided by memory on the directors. A portion of the memory corresponding to the global cache area may be accessible to all of the directors. A portion of the memory corresponding to the local cache area may only accessible by processors on a same one of the directors as the portion of the memory. Following loading the data into the local cache area, storage of the data in the global cache area may be cancelled. Maintaining multiple cache areas in a storage device having multiple processors may also include loading data from the specific portion of non-volatile storage into the global cache area in response to the specific processor performing a read operation of data meeting other criteria that would cause the data to not be initially loaded into the local cache area. The other criteria may be that the data needs to be locked.

According further to the system described herein, a non-transitory computer readable medium contains software that maintains multiple cache areas in a storage device having multiple processors. The software includes executable code that loads data from a specific portion of non-volatile storage into a local cache area in response to a specific processor of a first subset of the processors performing a read operation to the specific portion of non-volatile storage, where the local cache area is accessible to the first subset of the processors and is inaccessible to a second subset of the processors that is different than the first subset of the processors and includes executable code that loads data from the specific portion of non-volatile storage into a global cache area in response to one of the processors performing a write operation to the specific portion of non-volatile storage, where the global cache area is accessible to the first subset of the processors and to the second subset of the processors. The data may be removed from the local cache area in response to one of the first subset of the processors performing a write operation thereto. Following removal from the local cache area, the data may be loaded into the global cache area. Different ones of the processors may be placed on different directors. The global cache area and the local cache area may be provided by memory on the directors. A portion of the memory corresponding to the global cache area may be accessible to all of the directors. A portion of the memory corresponding to the local cache area may only accessible by processors on a same one of the directors as the portion of the memory. Following loading the data into the local cache area, storage of the data in the global cache area may be cancelled. The software may also include executable code that loads data from the specific portion of non-volatile storage into the global cache area in response to the specific processor performing a read operation of data meeting other criteria that would cause the data to not be initially loaded into the local cache area. The other criteria may be that the data needs to be locked.

According further to the system described herein, maintaining multiple cache areas in a storage device having multiple processors includes loading data from a specific portion of non-volatile storage into a first local cache area in response to a first processor of a first subset of the processors performing a read operation to the specific portion of non-volatile storage, where the first local cache area is accessible to the first subset of the processors and is inaccessible to a second subset of the processors that is different than the first subset of the processors and is inaccessible to a third subset of the processors that is different than the first subset of the processors and the second subset of the processors, loading data from the specific portion of non-volatile storage into a second local cache area in response to a second processor of the second subset of the processors performing a read operation to the specific portion of non-volatile storage, where the second local cache area is different from the first local cache area and where the second local cache area is accessible to the second subset of the processors and is inaccessible to the first subset of the processors and the third subset of the processors, and loading data from the specific portion of non-volatile storage into a global cache area in response to one of the processors performing a write operation to the specific portion of non-volatile storage, where the global cache area is accessible to the first subset of the processors and to the second subset of the processors and to the third subset of processors. The data may be removed from the first local cache area and the second local cache area in response to one of the first subset of the processors or the second subset of processors performing a write operation thereto. Following removal from the first local cache area and the second local cache area, the data may be loaded into the global cache area. Different ones of the processors may be placed on different directors. The global cache area and the local cache areas may be provided by memory on the directors. A portion of the memory corresponding to the global cache area may be accessible to all of the directors. A portion of the memory corresponding to the local cache area may only accessible by processors on a same one of the directors as the portion of the memory. A dynamic data portion of a track ID table may indicate which of the directors contain the data in a corresponding local cache area thereof. The dynamic data portion may indicate up to four directors that contain the data in a corresponding local cache area thereof. In response to adding a local cache slot to one of the directors for the data, a corresponding local cache slot for an other one of the directors may be eliminated.

According further to the system described herein, a non-transitory computer readable medium contains software that maintains multiple cache areas in a storage device having multiple processors. The software includes executable code that loads data from a specific portion of non-volatile storage into a first local cache area in response to a first processor of a first subset of the processors performing a read operation to the specific portion of non-volatile storage, where the first local cache area is accessible to the first subset of the processors and is inaccessible to a second subset of the processors that is different than the first subset of the processors and is inaccessible to a third subset of the processors that is different than the first subset of the processors and the second subset of the processors, executable code that loads data from the specific portion of non-volatile storage into a second local cache area in response to a second processor of the second subset of the processors performing a read operation to the specific portion of non-volatile storage, where the second local cache area is different from the first local cache area and wherein the second local cache area is accessible to the second subset of the processors and is inaccessible to the first subset of the processors and the third subset of the processors, and executable code that loads data from the specific portion of non-volatile storage into a global cache area in response to one of the processors performing a write operation to the specific portion of non-volatile storage, where the global cache area is accessible to the first subset of the processors and to the second subset of the processors and to the third subset of processors. The data may be removed from the first local cache area and the second local cache area in response to one of the first subset of the processors or the second subset of processors performing a write operation thereto. Following removal from the first local cache area and the second local cache area, the data may be loaded into the global cache area. Different ones of the processors may be placed on different directors. The global cache area and the local cache areas may be provided by memory on the directors. A portion of the memory corresponding to the global cache area may be accessible to all of the directors. A portion of the memory corresponding to the local cache area may only accessible by processors on a same one of the directors as the portion of the memory. A dynamic data portion of a track ID table may indicate which of the directors contain the data in a corresponding local cache area thereof. The dynamic data portion may indicate up to four directors that contain the data in a corresponding local cache area thereof. In response to adding a local cache slot to one of the directors for the data, a corresponding local cache slot for an other one of the directors may be eliminated.

According further to the system described herein, maintaining multiple cache areas in a storage device having multiple processors includes loading data from a specific portion of non-volatile storage into a local cache slot in response to a specific processor of a first subset of the processors performing a read operation to the specific portion of non-volatile storage, where the local cache slot is accessible to the first subset of the processors and is inaccessible to a second subset of the processors that is different than the first subset of the processors and includes converting the local cache slot into a global cache slot in response to one of the processors performing a write operation to the specific portion of non-volatile storage, wherein the global cache area is accessible to the first subset of the processors and to the second subset of the processors. Different ones of the processors may be placed on different directors. The global cache slot and the local cache slot may be provided by memory on the directors. A portion of the memory corresponding to the global cache slot may be accessible to all of the directors. A portion of the memory corresponding to the local cache slot may only be accessible by processors on a same one of the directors as the portion of the memory. Following loading the data into the local cache slot, storage of the data in the global cache slot may be cancelled. The data from the local cache slot may be provided to the specific processor independent of completing modifying system metadata indicating that the data has been loaded into the local cache slot. Prior to loading the data in to the local cache slot, prior data may be removed from the local cache slot. Removing the prior data may include initiating a metadata modification corresponding thereto, where the prior data is removed independent of completion of modification of the metadata. Prior to converting the local cache slot into a global cache slot, the local cache slot may be chosen from a plurality of local cache slots that contain the data.

According further to the system described herein, a non-transitory computer readable medium contains software that maintains multiple cache areas in a storage device having multiple processors. The software includes executable code that loads data from a specific portion of non-volatile storage into a local cache slot in response to a specific processor of a first subset of the processors performing a read operation to the specific portion of non-volatile storage, where the local cache slot is accessible to the first subset of the processors and is inaccessible to a second subset of the processors that is different than the first subset of the processors and includes executable code that converts the local cache slot into a global cache slot in response to one of the processors performing a write operation to the specific portion of non-volatile storage, where the global cache area is accessible to the first subset of the processors and to the second subset of the processors. Different ones of the processors may be placed on different directors. The global cache slot and the local cache slot may be provided by memory on the directors. A portion of the memory corresponding to the global cache slot may be accessible to all of the directors. A portion of the memory corresponding to the local cache slot may only be accessible by processors on a same one of the directors as the portion of the memory. Following loading the data into the local cache slot, storage of the data in the global cache slot may be cancelled. The data from the local cache slot may be provided to the specific processor independent of completing modifying system metadata indicating that the data has been loaded into the local cache slot. Prior to loading the data in to the local cache slot, prior data may be removed from the local cache slot. Removing the prior data may include initiating a metadata modification corresponding thereto, where the prior data is removed independent of completion of modification of the metadata. Prior to converting the local cache slot into a global cache slot, the local cache slot may be chosen from a plurality of local cache slots that contain the data.

BRIEF DESCRIPTION OF THE DRAWINGS

Embodiments of the system are described with reference to the several figures of the drawings, noted as follows.

FIG. 6 is a schematic illustration showing a track ID table for a data storage device according to an embodiment of the system described herein.

FIG. 7 is a schematic illustration showing an entry for a track ID table for a data storage device according to an embodiment of the system described herein.

FIG. 8 is a schematic illustration showing a dynamic metadata field for an entry for a track ID table for a data storage device according to an embodiment of the system described herein.

DETAILED DESCRIPTION OF VARIOUS EMBODIMENTS

Figure 1:
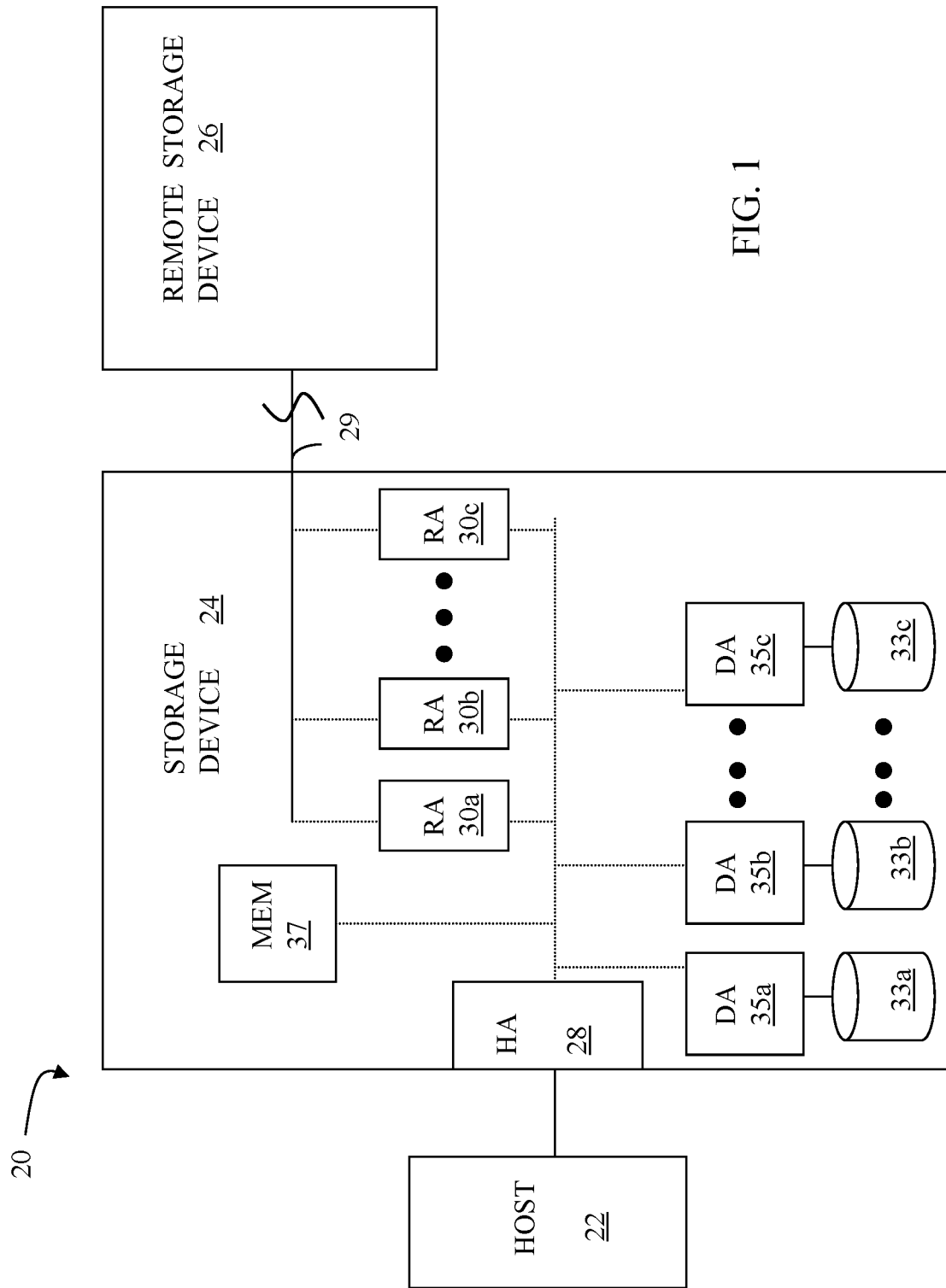
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix or VMAX storage system produced by Dell EMC of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 only shows one host 22 and one HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30*a*, 30*b*, 30*c*. The RA's 30*a*-30*c* may be coupled to the link 29 and be similar to the HA 28, but are used to transfer data between the storage devices 24, 26.

The storage device 24 may include one or more disks (including solid state units and/or other types of storage units), each containing a different portion of data stored on each of the storage device 24. FIG. 1 shows the storage device 24 having a plurality of disks 33*a*, 33*b*, 33*c*. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. An internal data path exists between the DA's 35a-35c, the HA 28 and the RA's 30a-30c of the storage device 24. Note that, in other embodiments, it is possible for more than one disk to be serviced by a DA and that it is possible for more than one DA to service a particular disk. The storage device 24 may also include a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and/or the RA's 30a-30c, and may contain a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 may be subdivided into a plurality of volumes or logical devices, where each of the logical devices may or may not correspond to one or more disks of the remote storage device 26.

Figure 2:
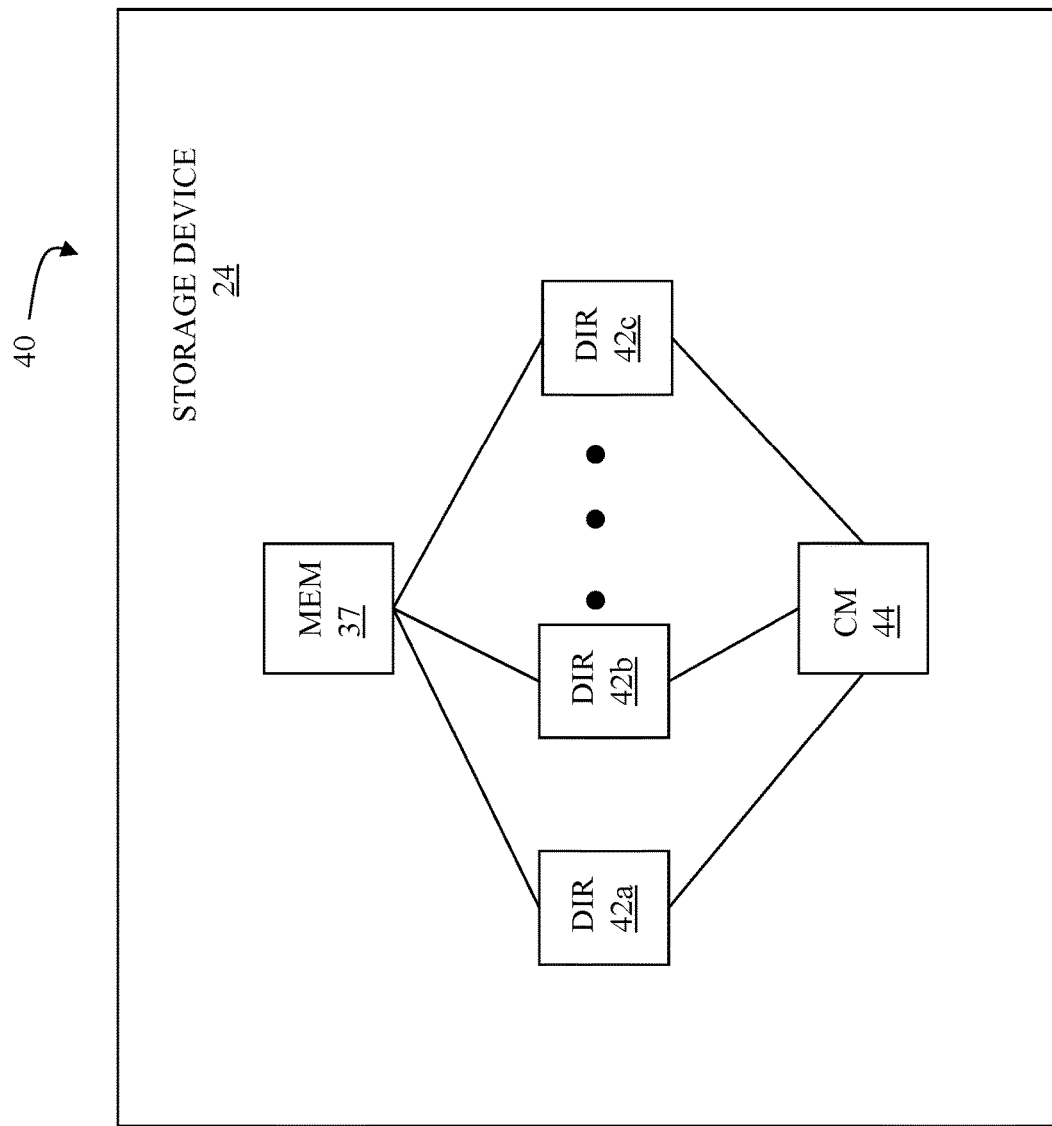
FIG. 2 is a schematic diagram illustrating an embodiment of the storage device where each of a plurality of directors are coupled to the memory.

FIG. 2 is a schematic diagram 40 illustrating an embodiment of the storage device 24 where each of a plurality of directors 42a-42c are coupled to the memory 37. Each of the directors 42a-42c represents at least one of the HA 28, RAs 30a-30c, or DAs 35a-35c. The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 26. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system.

In addition, all or at least part of the global memory 37 may be provided on one or more of the directors 42a-42c and shared with other ones of the directors 42a-42c. In an embodiment, the features discussed in connection with the storage device 24 may be provided as one or more director boards having CPUs, memory (e.g., DRAM, etc.) and interfaces with Input/Output (I/O) modules.

Figure 3:
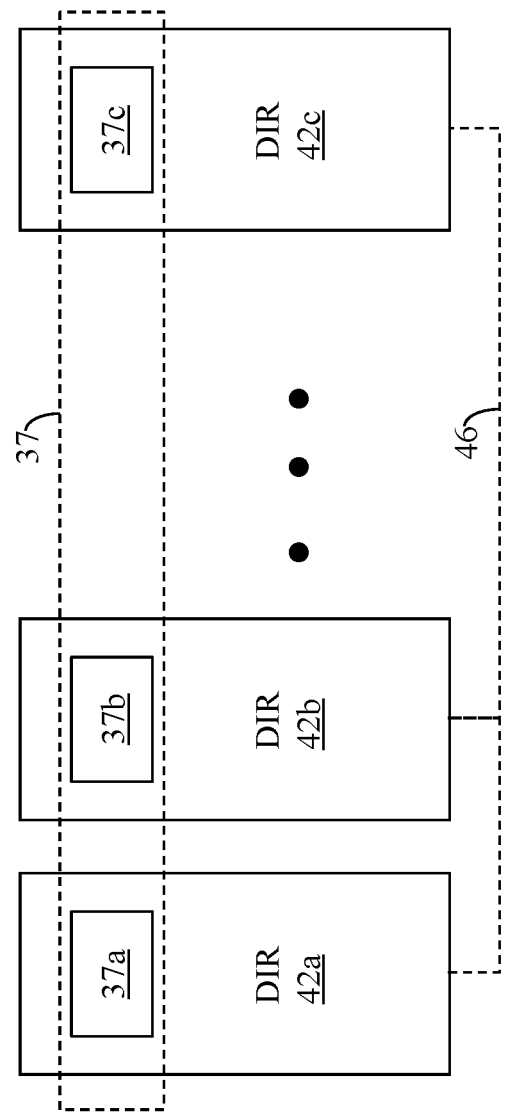
FIG. 3 is a schematic illustration showing a memory for a data storage device according to an embodiment of the system described herein.

FIG. 3 illustrates the memory 37 in more detail as including a first shared memory portion 37a disposed on the director 42a, a second shared memory portion 32b disposed on the director 42b, and an nth shared memory portion 37c disposed on the director 42c. Any processors on any of the directors 42a-42c may access any of the shared memory portions 37a-37c so that, for example, a processor on the director 42a may access the shared memory portion 37b on the director 42b. Since the memory 37 is shared between the directors 42a-42c, accessing one of the shared portions 37a-37c includes initially locking the memory 37 (to prevent concurrent access to the same address space) and then maintaining data structures to keep track of owner(s) and state(s) of different segments of the address space of the memory 37.

In an embodiment herein, the memory 37 is used to provide global cache functionality so that data that is accessed is initially read from non-volatile storage (e.g., one of the disks 33a-33c) into the memory 37. A track of data may be read in to a global cache slot in the memory 37, which may be the same size as the track. A track may be 128 KB, although other sizes are possible, including variable sizes. Subsequent accesses of the same data are to the global cache in the memory 37 rather than to the non-volatile storage. Accessing data in the memory 37 instead of the drives 33a-33c generally increases throughput and decreases access time. If the data is not accessed for a period of time, a corresponding global cache slot in the memory 37 may be released to make room for new data to be loaded into the memory 37. Note that, if data in the memory 37 is only read, only one global cache slot is necessary but that if the data in the memory 37 is modified, then at least a second, duplicate, global cache slot needs to be created to provide redundancy.

Figure 4:
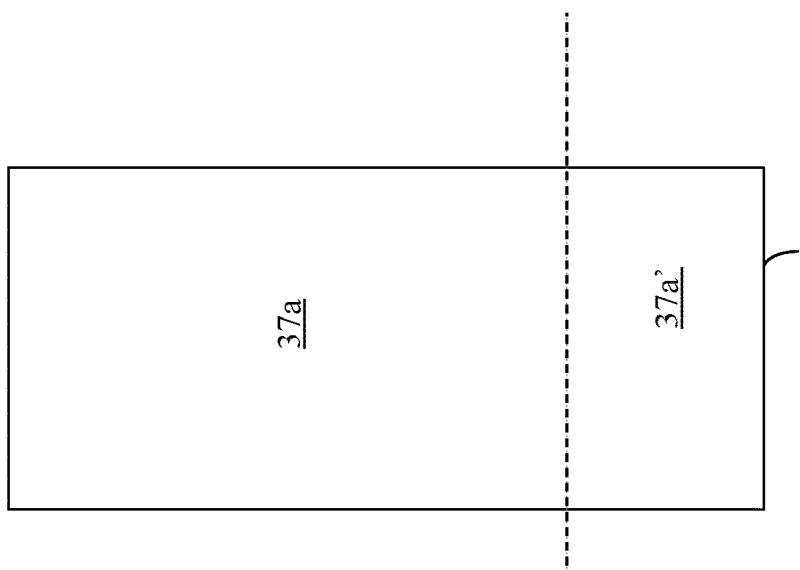
FIG. 4 is a schematic illustration showing a physical memory of a director for a data storage device according to an embodiment of the system described herein.

Referring to FIG. 4, physical memory 62 of the director 42a includes the shared memory portion 37a, which is part of the memory 37 as described above, and a local memory portion 37a', that is accessed only locally by processor(s) on the director 42a. The local memory portion 37a' may not be accessible by other ones of the directors 42b, 42c. In an embodiment herein, data that is read by a processor on the director 42a may be loaded into a local cache slot in the local memory portion 37a' rather than being loaded into a global cache slot of the memory 37. Loading the data into the local cache slot in the local memory portion 37a' provides a number of advantages. For example, subsequently accessing the data in the local memory portion 37a' may be more efficient (faster) than if the data were to be loaded into the memory 37 because the local memory portion 37a' is accessed by only the director 42a while the memory 37 is accessed by all of the directors 42a-42c, which requires more overhead (locks, collision avoidance, etc.). Note also that, since the data is placed in the local memory 37a' only for reading, it is not necessary to keep track of data that needs to be destaged (written) back to non-volatile memory (e.g., one or more of the disks 33a-33c).

Figure 5:
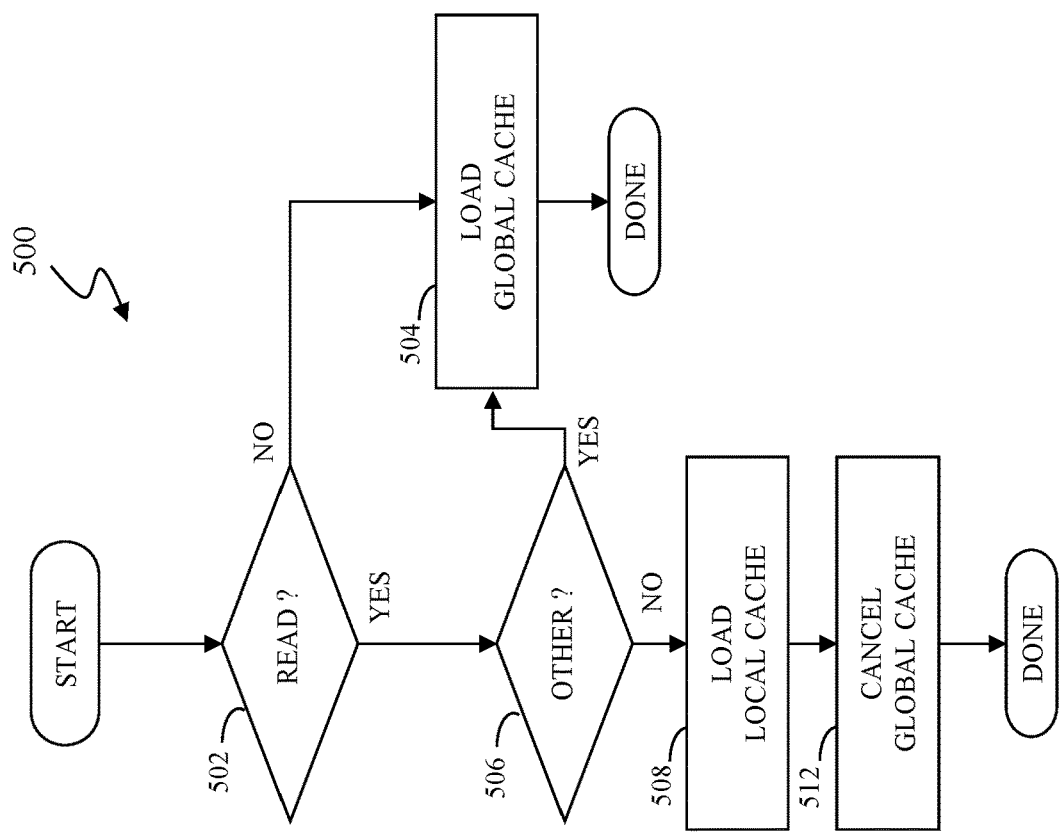
FIG. 5 is a flow diagram illustrating processing performed in connection with loading data in to cache slots according to an embodiment of the system described herein.

Referring to FIG. 5, a flow diagram 500 illustrates processing performed in connection with loading data in to cache slots. The processing illustrated by the flow diagram 500 is performed in addition to, and prior to, conventional global cache handling and determines whether data is to be stored in local cache rather than global cache. Processing begins at a first step 502 where it is determined if the data is being fetched from non-volatile memory (e.g., the disks 33a-33c) for reading only. In some cases, data is fetched from non-volatile memory in connection with a write operation (e.g., fetch, modify in cache, and then destage cache slot). If it is determined at the test step 502 that the data is not being fetched for reading only, then control transfers from the test step 502 to a step 504 where the data is loaded into global cache using, for example, a convention cache loading mechanism. Otherwise, if it is determined at the test step 502 that the data is being fetched for reading only, then control transfers from the test step 502 to a test step 506 where it is determined if the data meets other criteria that would cause the data to not be initially loaded into the local cache. In an embodiment herein, all data that is not initially fetched in connection with a write operation is loaded into the local cache. However, in some embodiments, there may be different criteria that govern when and whether data being fetched is to be initially loaded into the local cache. For example, data being loaded for read only may still need to be locked (e.g., in connection with a snapshot), in which case it is more advantageous to use global cache, which has a lock mechanism.

If it is determined at the step 506 that the data does meet some other criteria that merits initially loading the data into global cache, then control transfers to the step 504, described above, where the data is loaded into global cache using, for example, a convention cache loading mechanism. Otherwise, control transfers from the test step 506 to a step 508 where the data is loaded into local cache. Following the step 508 is a step 512 where storage of the data in the global cache is cancelled (e.g., by setting an appropriate flag). That is, data that is initially loaded into the local cache is not also loaded into the global cache. Following the step 512, processing is complete. Data may be managed in the local cache using a simple mechanism, such as a table indicating which slots of the local cache correspond to which data from the non-volatile memory (e.g., the disks 33a-33c).

Referring to FIG. 6, a track ID table 600 is used for each logical device to keep track of physical locations of different tracks of data as well as which data is stored in cache and where the data is stored in cache. The track ID table 600 includes a plurality of entries 602-604, each of which corresponds to a track of the corresponding logical device. When a process accesses a particular track of the logical device, the system consults the track ID table to determine if the particular track is in cache and, if so where. If the particular data is not in cache, the track ID table indicates a physical location of the data (e.g., one of the disks 33a-33c). In an embodiment herein, the track ID table 600 may be stored in the memory 37 and accessed individually by each of the directors 42a-42c, although in other cases it is possible to have a duplicate copies of the track ID table 600 stored at each of the directors 42a-42c.

Referring to FIG. 7, the entry 602 of the track ID table 600 is shown in more detail as including a slot ID field 702, a dynamic metadata field 703, and a fixed metadata field 704. The slot ID field 702 may be used to indicate a specific one of the global cache slots in the memory 37 containing data for a corresponding track of a logical device. The dynamic metadata field 703 includes data that may be modified during the lifetime of the logical device. The fixed metadata field 704 includes data that is expected to not be modified during the lifetime of the logical device. As described in more detail elsewhere herein, the dynamic metadata field 703 may be used to maintain data used in connection with fetching data to a local cache of one or more of the directors 42a-42c.

Referring to FIG. 8, the dynamic metadata field 703 is shown in more detail as including a plurality of director fields 802-804 that each indicate (point to) are particular one of the directors 42a-42c. In an embodiment herein, the dynamic metadata field 703 uses four director fields, but of course any number of director fields may be used. The director fields 802-804 indicate which of the directors 42a-42c has fetched data into a local cache thereof. Thus, for example, if the director 42a fetches data into the local cache thereof, a pointer (indicator) will be entered into one of the director fields 802-804 of the corresponding entry for the data in the track ID table. The information in the track ID table provides indication to all of the directors 42a-42c that corresponding data is maintained in the local cache of the director 42a. The information provided in the dynamic metadata field may be in addition to any local information used to manage the local cache (e.g., simple table maintained locally at each of the directors 42a-42c).

Figure 9:
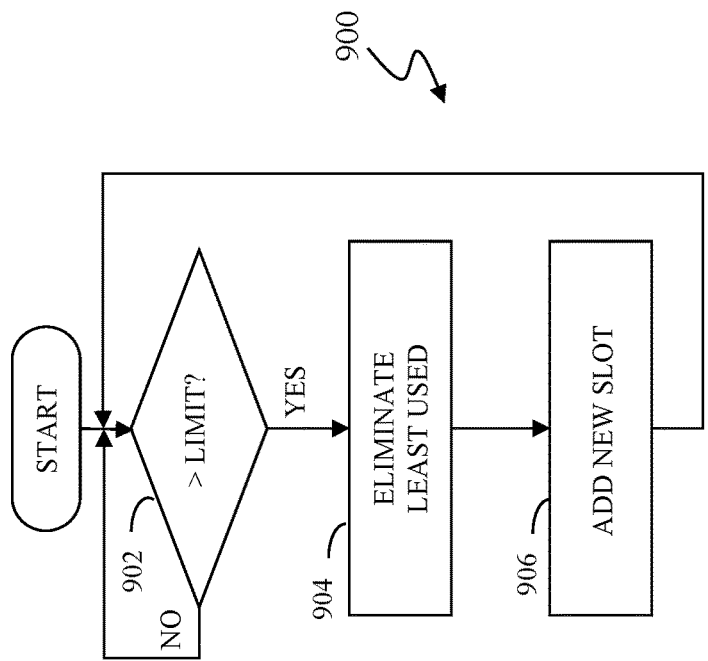
FIG. 9 is a flow diagram illustrating processing performed in connection with adding an extra local cache slot according to an embodiment of the system described herein.

Referring to FIG. 9, a flow diagram illustrates processing performed in connection with adding an extra local cache slot. As discussed elsewhere herein, it is possible for one or more of the directors 42a-42c to maintain a local cache slot for the same underlying data, but that there may be a limit (e.g., four) to the maximum number of the directors 42a-42c that can maintain a local cache slot for the same data based on limitations with existing data structures, such as the size of the dynamic metadata field 703, discussed above. Processing begins at a first step 902 where it is determined an attempt is being made to create more local cache slots than a predetermined limit (e.g., four). If not, then control transfers back to the step 902 to continue to poll. Otherwise, control transfers from the step 902 to a step 904 where a least used (least recently used) one of the local cache slots is eliminated by, for example, disposing of the local cache slot at the corresponding one of the directors 42a-42c and making appropriate adjustments to corresponding data structures, such as the dynamic metadata field 703. Following the step 904 is a step 906 where the new local cache slot is added. Following the step 906, control transfers back to the step 902, discussed above, for another iteration.

In some instances, it may be desirable to transition data from the local cache to the global cache and vice versa. For example, if data is initially read into the local cache, but then is modified, it could be more efficient to be able to convert a local cache slot into a global cache slot rather than needing to allocate a new global cache slot. In an embodiment herein, slots are transitioned between local cache and global cache and vice versa by modifying metadata that manages the caches, as described in more detail elsewhere herein.

Figure 10:
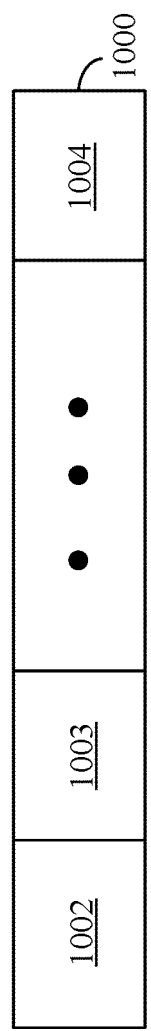
FIG. 10 is a schematic illustration showing a cache control slot for a data storage device according to an embodiment of the system described herein.

Referring to FIG. 10, a cache control slot 1000 includes a plurality of entries 1002-1004 that indicate status and other information for the global cache in the memory 37. In an embodiment herein, each of the directors 42a-42c maintains a local copy of the cache control slot 1000, but it is expected that all copies on all of the directors 42a-42c are identical. Conventional lock mechanisms and communication between the directors 42a-42c provides coordinated manipulation of the entries for managing the global cache. Each of the entries 1002-1004 includes information regarding a state of a specific portion of the global cache, including whether the portion is available, an indication of the source of the data in the cache (e.g., track/sector of the underlying data), an indication of whether the data has been modified since being loaded into the cache, a timestamp indicating when the data was last accessed, etc.

Each of the directors 42a-42c may also maintain similar data for managing the corresponding local cache. In the case of local caches, however, the data may be different for different ones of the directors 42a-42c. That is, data for the local cache at the director 42a is different from data for the local cache at the director 42b.

Figure 11:
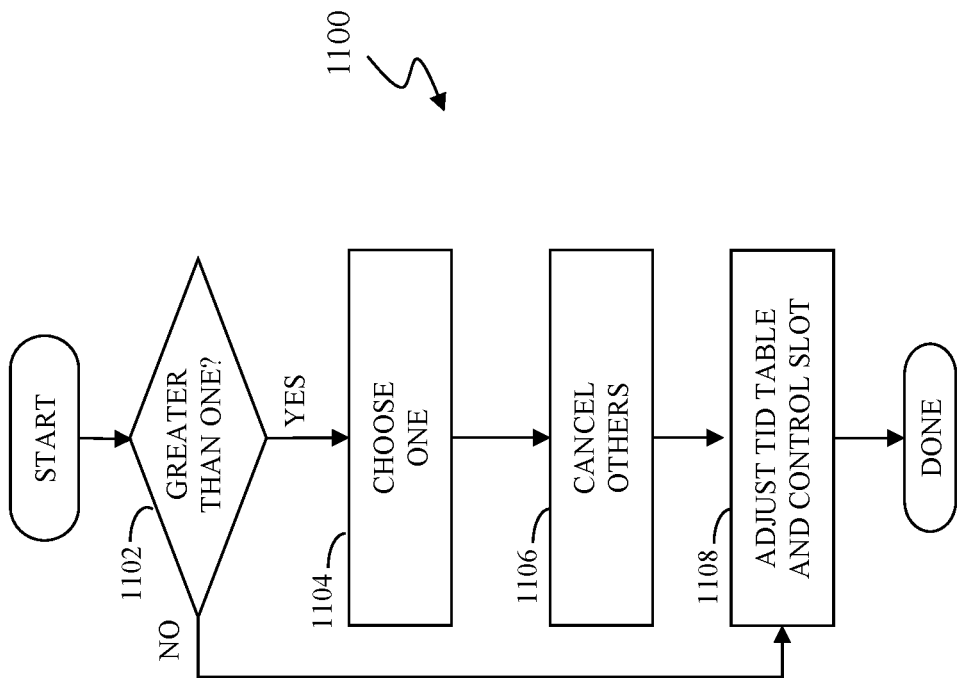
FIG. 11 is a flow diagram illustrating processing performed in connection with transitioning a local cache slot into a global cache slot according to an embodiment of the system described herein.

Referring to FIG. 11, a flow diagram 1100 illustrates processing performed in connection with transitioning a local cache slot into a global cache slot. As discussed elsewhere herein, there may be any number of reasons for making such a transition, such as a write operation to data that had been initially loaded into a local cache slot. Processing begins at a first step 1102 where it is determined if more than one of the directors 42a-42c is maintaining a version of the data in a local cache slot. As discussed elsewhere herein (see, for example, FIG. 8 and the corresponding discussion), it is possible for more than one of the directors 42a-42c to maintain a local cache slot for the same data. If it is determined at the step 1102 that there is more than one of the directors 42a-42c maintaining a version of the data in a local cache slot, then control transfers from the test step 1102 to a step 1104 where one of the multiple local cache slot copies of the data is chosen to be converted to a global cache slot. Any appropriate criteria may be used at the step 1104, such as choosing one of the multiple local cache slot copies of the data that was most recently accessed, or accessed more times than other ones, etc.

Following the step 1104 is a step 1106 where other ones of the of the multiple local cache slot copies of the data that were not chosen at the step 1104 are eliminated. Processing at the step 1106 may include sending a signal to ones of the director boards 42a-42c containing local cache slot copies of the data that were not chosen at the step 1104. A recipient of the signal would erase/invalidate a corresponding local cache slot copy of the data. Following the step 1106 is a step 1108 where both the track ID table 600 and the control slot 1000 are modified to reflect the change. Note that the step 1108 is also reached directly from the step 1102 if it is determined that there is not more than one of the directors 42a-42c that is maintaining a version the data in a local cache slot thereof (i.e., there is only one version of the data). Following the step 1108, processing is complete.

Figure 12:
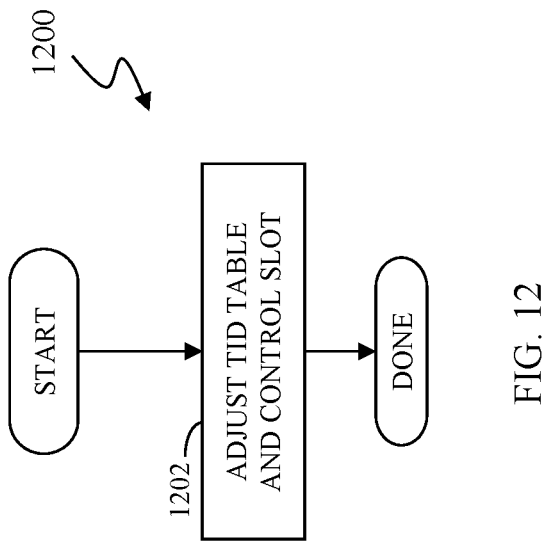
FIG. 12 is a flow diagram illustrating processing performed in connection with transitioning a global cache slot into a local cache slot according to an embodiment of the system described herein.

Referring to FIG. 12, a flow diagram 1200 illustrates processing performed in connection with converting a cache slot in the global cache in the memory 37 into a local cache slot in one of the directors 42a-42c. Note that, generally, a conversion from global cache to local cache is relatively straight-forward. Processing begins at a first step 1202 where both the track ID table 600 and the control slot 1000 are modified to reflect the change. The change essentially causes the slot to appear to be "removed" from the global cache for all of the director boards 42a-42c and to be available as a local cache slot for one of the director boards 42a-42c. Following the step 1202, processing is complete.

Figures 13, 14:
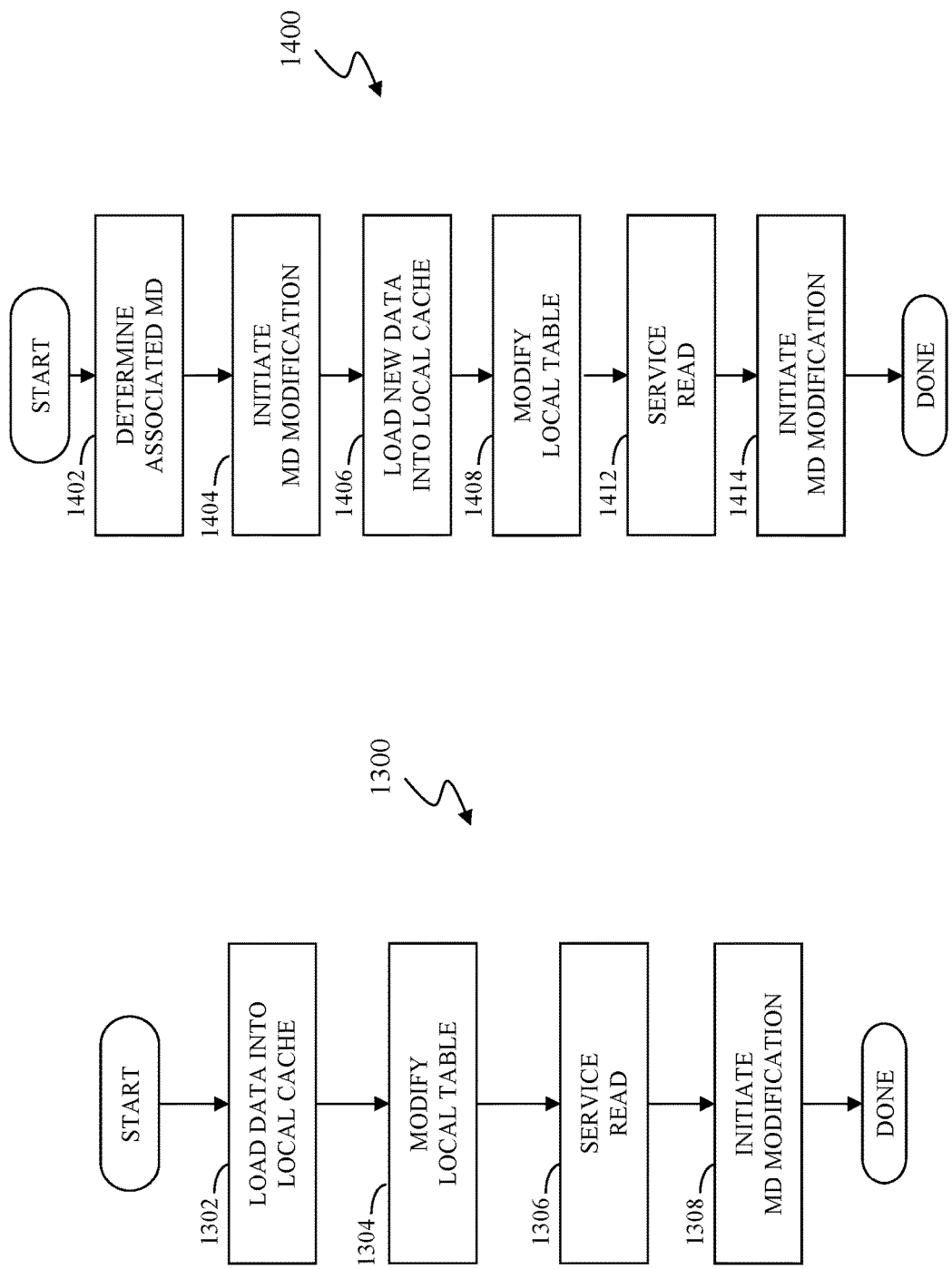
FIG. 13 is a flow diagram illustrating processing performed in connection with loading local cache with data and modifying corresponding metadata according to an embodiment of the system described herein.
FIG. 14 is a flow diagram illustrating processing performed in connection with loading local cache with new data to replace prior data and modifying corresponding metadata according to an embodiment of the system described herein.

Referring to FIG. 13, a flow diagram 1300 illustrates steps performed in connection with loading data in the local cache and modifying corresponding global cache metadata. Processing begins at a first step 1302 where the data is loaded into the local cache. Following the step 1302 is a step 1304 where a local table (described elsewhere herein) that is used to keep track of the local cache is modified to reflect the new data being added. Following the step 1304 is a step 1306 where the read request (from the process that initially requested the data) is serviced. Note that, at the step 1306, the requesting process receives the requested data and a signal that the I/O has completed. Thus, the requesting process is free to perform a next processing step (not shown) following receiving the signal at the step 1306. Following the step 1306 is a step 1308 where the system initiates modification of the global cache metadata to reflect the data that has just been loaded into the local cache. Note that, unlike with the global cache, it is possible for the requesting process to receive a signal that the operation has completed prior to the metadata being modified to reflect the new state of the data. Following the step 1308, processing is complete.

Referring to FIG. 14, a flow diagram 1400 illustrates steps performed in connection with replacing data in the local cache with new data and modifying corresponding global cache metadata. Data is replaced when the data has not been accessed/used recently, which may be determined, for example, by the local table maintained by the director. Processing begins at a first step 1402 where the metadata associated with the data that is being replaced is determined. Following the step 1402 is a step 1404 where modification of the metadata is initiated. Note that initiation metadata modification at the step 1404 does not necessarily require immediate completion of the modification with the step 1404 and, generally, the modification may be performed asynchronously (independently) with respect to follow on processing.

Following the step 1404 is a step 1406 where the new data is loaded into the local cache to replace the prior data. Following the step 1406 is a step 1408 where the local table that is used to keep track of the local cache is modified to reflect the new data being added. Following the step 1408 is a step 1412 where the read request (from the process that initially requested the new data) is serviced. Note that, at the step 1412, the requesting process receives the requested data and a signal that the I/O has completed irrespective of whether the metadata modification initiated at the step 1404 has completed. The requesting process is free to perform a next processing step (not shown) following receiving the signal at the step 1412. Following the step 1412 is a step 1414 where the system initiates modification of the global cache metadata to reflect the new data that has just been loaded into the local cache. Note that, unlike with the global cache, it is possible for the requesting process to receive a signal that the operation has completed prior to the metadata being modified to reflect the new state of the data. Following the step 1414, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB)

interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of maintaining multiple cache areas in a storage device having multiple processors, comprising:
    loading data from a specific portion of non-volatile storage into a cache slot in response to a specific processor of a first subset of the processors performing a read operation to the specific portion of non-volatile storage; and
    making the cache slot accessible to a second set of processors different from the first set of processors in response to one of the processors performing a write operation to the specific portion of non-volatile storage.

2. A method, according to claim 1, wherein different ones of the processors are placed on different directors.

3. A method, according to claim 2, wherein the cache slot is provided by memory on the directors.

4. A method, according to claim 3, wherein a portion of the memory corresponds to a global cache slot that is accessible to all of the directors.

5. A method, according to claim 4, wherein following loading the data into the cache slot, storage of the data in the global cache slot is cancelled.

6. A method, according to claim 3, wherein a portion of the memory corresponding to the cache slot is only accessible by processors on a same one of the directors as the portion of the memory.

7. A method, according to claim 1, wherein the data from the cache slot is provided to the specific processor independent of completing modifying system metadata indicating that the data has been loaded into the cache slot.

8. A method, according to claim 1, wherein prior to loading the data in to the cache slot, prior data is removed from the cache slot.

9. A method, according to claim 8, wherein removing the prior data includes initiating a metadata modification corresponding thereto, wherein the prior data is removed independent of completion of modification of the metadata.

10. A method, according to claim 1, wherein prior to making the cache slot accessible to a second set of processors, the cache slot is chosen from a plurality of cache slots that contain the data.

11. A non-transitory computer readable medium containing software that maintains multiple cache areas in a storage device having multiple processors, the software comprising:
    executable code that loads data from a specific portion of non-volatile storage into a cache slot in response to a specific processor of a first subset of the processors performing a read operation to the specific portion of non-volatile storage; and
    executable code that makes the cache slot accessible to a second set of processors different from the first set of processors in response to one of the processors performing a write operation to the specific portion of non-volatile storage.

12. A non-transitory computer readable medium, according to claim 11, wherein different ones of the processors are placed on different directors.

13. A non-transitory computer readable medium, according to claim 12, wherein the cache slot is provided by memory on the directors.

14. A non-transitory computer readable medium, according to claim 13, wherein a portion of the memory corresponds to a global cache slot that is accessible to all of the directors.

15. A non-transitory computer readable medium, according to claim 14, wherein following loading the data into the cache slot, storage of the data in the global cache slot is cancelled.

16. A non-transitory computer readable medium, according to claim 13, wherein a portion of the memory corresponding to the cache slot is only accessible by processors on a same one of the directors as the portion of the memory.

17. A non-transitory computer readable medium, according to claim 11, wherein the data from the cache slot is provided to the specific processor independent of completing modifying system metadata indicating that the data has been loaded into the cache slot.

18. A non-transitory computer readable medium, according to claim 11, wherein prior to loading the data in to the cache slot, prior data is removed from the cache slot.

19. A non-transitory computer readable medium, according to claim 18, wherein removing the prior data includes initiating a metadata modification corresponding thereto, wherein the prior data is removed independent of completion of modification of the metadata.

20. A method, according to claim 11, wherein prior to making the cache slot accessible to a second set of processors, the cache slot is chosen from a plurality of cache slots that contain the data.

* * * * *